US008395991B2

(12) United States Patent
Sachdeva et al.

(10) Patent No.: US 8,395,991 B2

(45) Date of Patent: Mar. 12, 2013

(54) NON-SCALABLE TO SCALABLE VIDEO CONVERTER

(75) Inventors: Ravin Sachdeva, New Delhi (IN); Sumit Johar, New Delhi (IN); Emiliano Mario Piccinelli, Cavanego di Brianza (IT)

(73) Assignees: STMicroelectronics PVT. Ltd., Greater Noida Uttar Pradesh (IN); STMicroelectronics S.R.L., Agrate Brianza (MB) (IT)

( * ) Notice: Subject to any disclaimer, the term of this patent is extended or adjusted under 35 U.S.C. 154(b) by 481 days.

(21) Appl. No.: 12/559,152

(22) Filed: Sep. 14, 2009

(65) Prior Publication Data

US 2010/0067580 A1 Mar. 18, 2010

(30) Foreign Application Priority Data

Sep. 15, 2008 (IT) .............................. TO2008A0674

(51) Int. Cl.
*H04J 3/14* (2006.01)

(52) U.S. Cl. ................. 370/231; 348/14.12; 375/240.16

(58) Field of Classification Search ............... 348/14.01, 348/14.02, 14.08, 14.09, 14.12, 14.13, 14.15; 370/230–235; 375/240.16
See application file for complete search history.

(56) References Cited

U.S. PATENT DOCUMENTS

2003/0009764 A1* 1/2003 Krishnamachari ............. 725/93
2003/0048283 A1* 3/2003 Klein Gunnewiek et al. ............................. 345/660
2004/0139219 A1* 7/2004 Radha ........................... 709/234
2005/0169312 A1* 8/2005 Cakareski et al. ............ 370/473
2005/0226322 A1* 10/2005 Van Der Vleuten et al. ......................... 375/240.08
2006/0072667 A1* 4/2006 Kirenko et al. .......... 375/240.23
2007/0009039 A1* 1/2007 Ryu ......................... 375/240.16
2007/0110150 A1* 5/2007 Wang et al. ................ 375/240.1
2007/0121723 A1* 5/2007 Mathew et al. .......... 375/240.12

(Continued)

FOREIGN PATENT DOCUMENTS

WO 2007/115133 10/2007

OTHER PUBLICATIONS

DeCock et al., "Bridging the Gap: Transcoding From Single-Layer H.264/AVC to Scalable SVC Video Streams", Advanced Concepts for Intelligent Vision Systems, Heidelberg, Berlin, Germany, Aug. 2007, pp. 652-662.

Barrau, "MPEG Video Transcoding to a Fine-Granular Scalable Format", International Conference on Image Processing, Rochester New York, Sep. 2002, vol. 1, pp. 717-720.

*Primary Examiner* — Jeffrey M Rutkowski
*Assistant Examiner* — Juvena Loo
(74) *Attorney, Agent, or Firm* — Allen, Dyer, Doppelt, Milbrath & Gilchrist, P.A.

(57) ABSTRACT

Systems and methods are for implementing a NSV2SV converter that converts a non-scalable video signal to a scalable video signal. In an implementation, a non-scalable video signal encoded in H.264/AVC standard is decoded and segmented into spatial data and motion data. The spatial data is resized into a desired resolution by down-sampling the spatial data. The motion data is also resized in every layer, except in the top layer, of a scalable video coding (SVC) encoder by using an appropriate measure. Further, the motion data is refined based on the resized spatial data in every layer of the SVC encoder. The refined motion data and the down-sampled spatial data are then transformed and entropy encoded in the SVC standard in every layer. The SVC encoded output from every layer is multiplexed to produce a scalable video signal.

26 Claims, 6 Drawing Sheets

U.S. PATENT DOCUMENTS

2007/0217503 A1* 9/2007 Haskell et al. ............ 375/240.1
2007/0230564 A1* 10/2007 Chen et al. ............... 375/240.01
2007/0230568 A1* 10/2007 Eleftheriadis et al. ..... 375/240.1
2008/0158339 A1* 7/2008 Civanlar et al. ............ 348/14.09
2010/0020866 A1* 1/2010 Marpe et al. ............. 375/240.02
2012/0042048 A1* 2/2012 Taubman ...................... 709/219

* cited by examiner

NON-SCALABLE TO SCALABLE VIDEO CONVERTER

FIELD OF THE INVENTION

The present invention relates to the field of video, and more particularly to video encoders and related methods.

BACKGROUND OF THE INVENTION

Digital video services have enabled improved quality video signal transmission, resulting in an immaculate video display at the consumer end. Among various video coding standards available, Moving Picture Experts Group-2 (MPEG-2) is very popular, as it can be applied to diversified bit rates and sample rates. Additionally, the MPEG-2 video coding standard provides mature and powerful video coding methods and supports scalability.

In order to cater to newer transmission media such as Cable Modem, xDSL, or UMTS, H.264/Advanced Video Coding (AVC) standard is gaining popularity as the basis of digital video transmission. This is because of its higher coding efficiency, lower bit rate, efficient bandwidth utilization, error resilience, low processing delay, support for scalability, and capability to produce high quality video. Moreover, H.264/AVC enables transmission of more video channels or higher quality video representations within the existing digital transmission capacities.

With the advent of a variety of end user devices and time varying networks, video adaptation on the various end user devices for appropriate video presentation has become very critical. For example, in broadcast, simulcast, or multicast transmissions, the same signal may be received by various end user devices, such as televisions, cell phones, computing devices, etc. The end user devices can have different characteristics in screen sizes, life span of power supplies, memory capabilities, CPU's, etc. This makes the task of video adaptability on the targeted end devices very challenging even while using the video coding standards such as MPEG-2, H.264/AVC, etc.

As a result, scalable video coding schemes are emerging that make it possible to adapt the bit rate and quality of a transmitted stream to the network bandwidth on which the stream is transmitted. The Scalable Video Coding or SVC standard has been developed as an extension to the H.264/AVC standard. Among several scalabilities, spatial scalability, i.e. video adaptability through different spatial resolutions, is one of the key features generally required in scalable video streaming over heterogeneous devices such as mobile phones, televisions, personal digital assistants (PDAs), laptops, and so on. However, appropriate techniques for achieving spatial scalability and producing a scalable video signal subsuming multiple distinct resolutions from a non-scalable video signal are currently unavailable.

SUMMARY OF THE INVENTION

This summary is provided to introduce concepts related to a non-scalable to scalable video (NSV2SV) converter, which is further described below in the detailed description. This summary is not intended to identify essential features of the claimed subject matter, nor is it intended for use in determining the scope of the claimed subject matter.

In one embodiment, a system including a broadcasting system, a NSV2SV converter, and a receiving device can be used. The NSV2SV converter produces an output video signal in a scalable format, hereinafter referred to as scalable video signal, from a received input video signal in a non-scalable format, hereinafter referred to as non-scalable video signal. The scalable video signal may be in the form of a multi-layer bit stream in which each layer corresponds to a different resolution. The non-scalable input video signal, typically, has a single bit-stream coded in a standard that supports scalability, such as H.264/AVC standard, MPEG-2.

In one implementation, the broadcasting system can transmit the non-scalable video signal to an intermediate device. The intermediate device includes the NSV2SV converter, which is configured to convert the non-scalable video signal into the scalable video signal conforming to a scalable video standard, for example, the Scalable Video Coding (SVC) standard. The receiving device receives the scalable output video signal from the intermediate device. Further, the receiving device can extract and use the layers that correspond to a resolution supported by the receiving device, from the multiple layered bit stream included in the scalable output video signal. In another implementation, the receiving device may receive only those layers that correspond to the supported resolution, from the intermediate device.

In particular, the NSV2SV converter includes a decoder that decodes the non-scalable input video signal. Spatial data and motion data are segmented from the decoded video signal. A spatial down-converter module down-samples and resizes the spatial data to the different resolutions. The resized spatial data and the segmented motion data are then processed by an encoder. To generate the multi-layer bit stream, the encoder includes multiple encoding layers, each of which generates a bit-stream layer corresponding to a distinct resolution.

In the encoding layers, the motion data is resized and refined to correspond to the different resolutions. For this, the encoding layers include a motion/texture information adaptation module (M/TIAM), also referred to as an adaptation module, and a motion refinement module (MRM). The adaptation module adapts the motion data from the decoded signal to the corresponding resolution of that encoding layer. For this, the adaptation module reuses the original motion data included in the non-scalable input video signal and produces adapted motion data. The motion refinement module (MRM) refines the adapted motion data based on the down-sampled spatial data for improving the resolution quality in that encoding layer. In one embodiment, in the top most encoding layer, the MRM, refines the segmented motion data based on the down-sampled spatial data. In such an embodiment, the top most encoding layer may not include the adaptation module.

Further, in the encoding layers, the output of the MRM, including the refined spatial and motion data, is transformed and encoded in a transform and entropy encoding module (TEC). In one implementation, the refined spatial and motion data is transformed into discrete cosine transform (DCT) coefficient values. Subsequently, the DOT coefficient values are entropy encoded. Thus multiple encoded bit stream layers corresponding to different resolutions are generated by the encoding layers. Further, the output signals of the TEC modules from the different encoding layers are multiplexed to produce a scalable video signal having a multi-layer bit stream subsuming a distinct resolution in each layer.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION OF THE PREFERRED EMBODIMENTS

Figure 1:
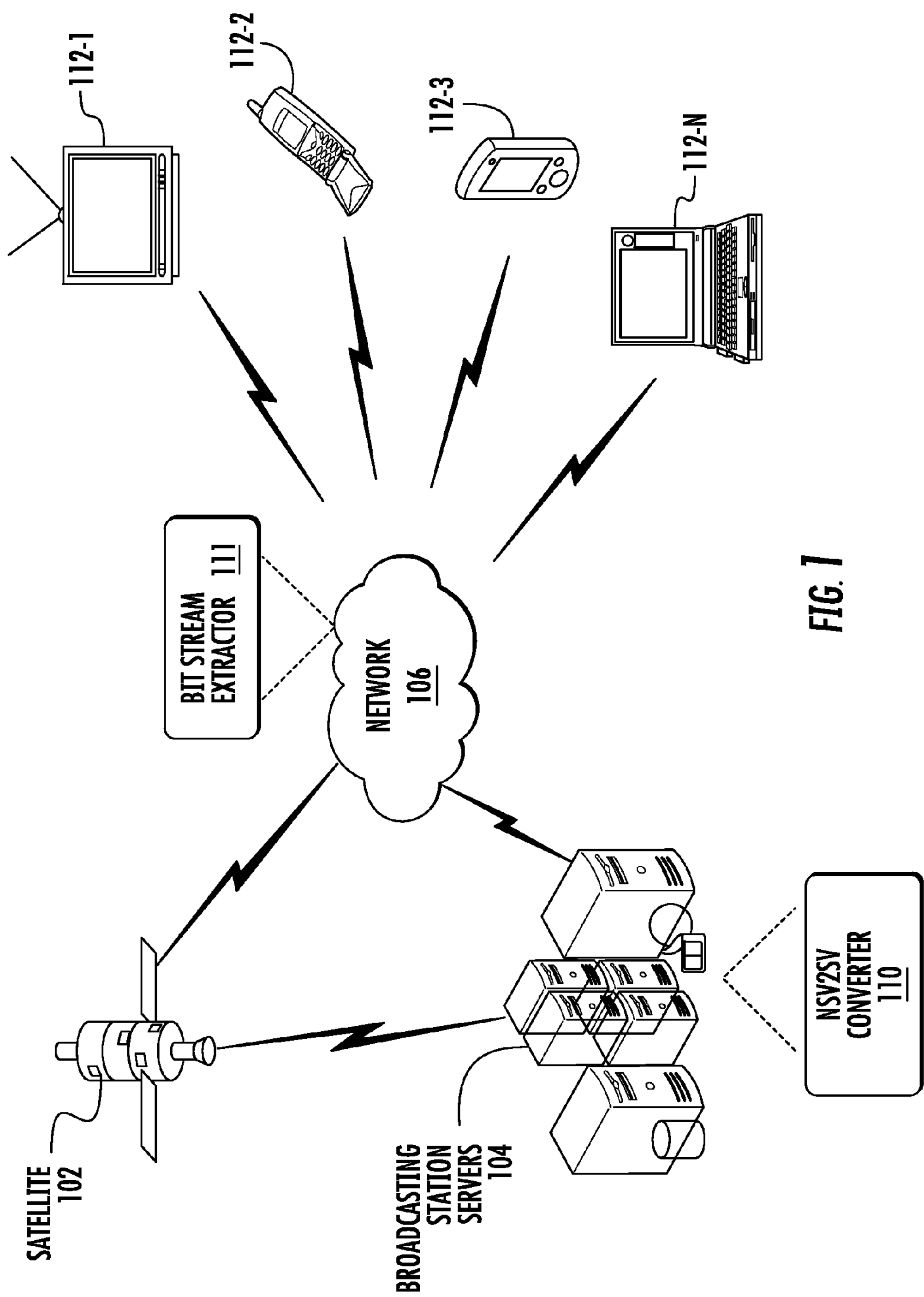
FIG. 1 illustrates an exemplary system implementing a Non-Scalable to Scalable Video (NSV2SV) converter in accordance with the present invention.

The disclosed subject matter relates to a non-scalable to a scalable video (NSV2SV) converter. More particularly, the subject matter relates to techniques for trans-coding non-scalable video content coded in video compression standards which support scalability, such as MPEG-2, H.264/AVC, and so on, into scalable video content in scalable video compression standards such as SVC. The disclosed techniques are based on fine-to-coarse-to-fine code conversion methods.

In an implementation, a system including a broadcasting system, a NSV2SV converter, and a receiving device can be used for generating and using a scalable-video signal from a broadcasted non-scalable video signal. The non-scalable video signal, typically, is a single bit-stream coded in a standard that supports scalability, such as 8.264/AVC standard, MPEG-2 and so on. The scalable video signal is in the form of a multi-layer bit stream in which each layer corresponds to a different resolution. In one implementation, the broadcasting system can transmit the non-scalable video signal to an intermediate device. The intermediate device includes the NSV2SV converter, which is configured to convert the non-scalable input video signal into the scalable output video signal. The receiving device receives the scalable output video signal from the intermediate device.

The NSV2SV converter can be implemented in a variety of electronic or communication devices in which a non-scalable video signal possessing a high resolution can be adapted and transmitted for display according to the display capabilities of the targeted end devices. Devices that can implement the disclosed NSV2SV converter include, but are not limited to, set-top boxes, base transceiver system (BTS), computing devices, televisions, mobile phones, laptops, personal digital assistants (PDAs), and so on, which can be employed in a variety of applications such as streaming, conferencing, surveillance, etc.

The NSV2SV converter can be thus advantageously used for transmitting scalable video signals to a variety of end user devices, in a resolution that is supported by the end user devices. The NSV2SV converter also enables efficient decoding of the video content received over diverse networks as it provides an option of decoding only a part of a the plurality of signals of different resolutions included in the scalable video signal.

Additionally, as compared to alternative approaches of recreating the motion information from the non-scalable input video signal for producing the scalable output video signal, the NSV2SV converter reuses the original motion information included in the input video signal, thereby reducing the complexity and computational load on an encoder and maintaining higher coding efficiency. Further, the NSV2SV converter also provides for improved efficiency use of network bandwidth and system memory as the non-scalable video signal can be converted once into the scalable video signal and saved in memory. The scalable video signal can then be transmitted multiple times to different end user devices as per the resolution capabilities of the end user devices.

Exemplary Systems

FIG. 1 illustrates an exemplary system 100 implementing a non-scalable to scalable video (NSV2SV) converter. The system 100 includes a satellite 102 and broadcasting station servers 104 communicating via a network 106. The broadcasting station servers 104 may be used for broadcast, simulcast, or multicast transmissions. The broadcasting station servers 104 may be implemented as any of a variety of conventional computing devices including, for example, a general purpose computing device, multiple networked servers (arranged in clusters or as a server farm), a mainframe, and so forth.

The network 106 may be a wireless or a wired network, or a combination thereof. The network 106 can be a collection of individual networks, interconnected with each other and functioning as a single large network (e.g., the Internet or an intranet). Examples of network 106 include, but are not limited to, Local Area Network (LAN), Wide Area Network (WAN), and so on.

The system further includes an intermediate device 108 communicating with the broadcasting station servers 104 via the network 106. The intermediate device 108 is connected to one or more end devices 112-1, 112-2, 112-3, . . . 112-N (hereinafter collectively referred to as end devices 112). The end devices 112 may be implemented as any of a variety of conventional computing devices, including, for example, a server, a desktop PC, a notebook or a portable computer, a workstation, a personal digital assistant (PDA), a mainframe computer, a mobile computing device, an Internet appliance, and so on.

In one implementation, the broadcasting station servers 104 can be configured to transmit video signals encoded in any of a variety of video coding standards such as H.264/AVC, H.263, MPEG-2, and so on. The transmitted video signal can be a non-scalable video signal subsuming a single layer bit stream of a certain input resolution. The non-scalable video signal can be transmitted from the satellite 102 either directly or via the broadcasting station servers 104 to an intermediate device 108 such as a set-top box, a base station transceiver system (BTS), and so on.

The intermediate device 108 includes a non-scalable video to scalable video (NSV2SV) converter 110 for converting the non-scalable video signal into a scalable video signal. The output scalable video signal can be a signal that subsumes a multi-layer bit stream corresponding to a distinct resolution in each layer. The scalable video signal is then transmitted to one or more of the end devices 112 for further processing.

In one implementation, the intermediate device 108 can be equipped with an extractor that receives information regarding the resolution supported by a target end device, such as 112-1. The extractor then extracts the layers corresponding to the supported resolution from the multi-layer bit stream and transmits the extracted layers to the target end device 112-1. The extracted layers are then decoded and rendered at the target end device 112-1. In another implementation, each of the end devices 112 includes an extractor that extracts the layers corresponding to the supported resolutions from the multi-layer bit stream. The extracted layers are then decoded and rendered at the end devices 112.

Figure 2:
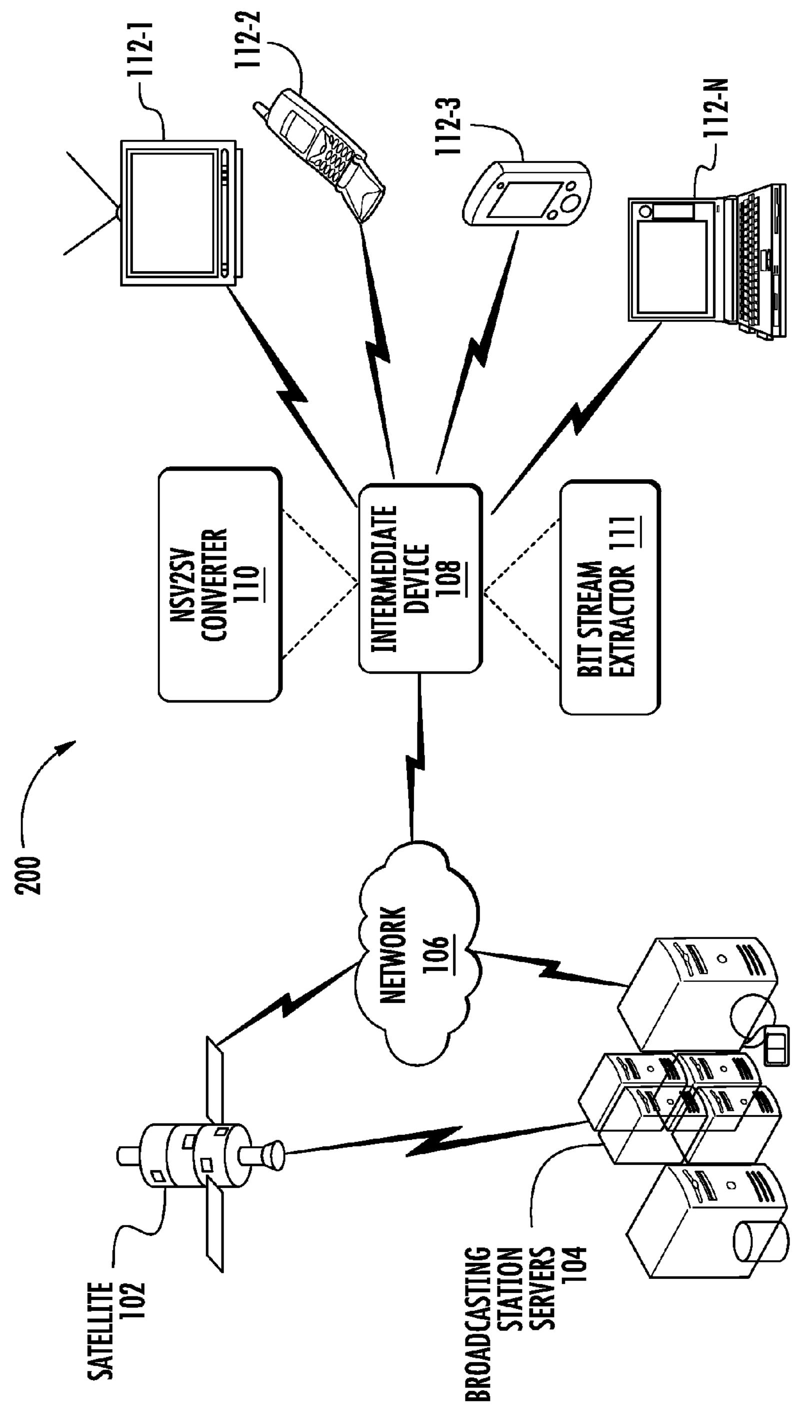
FIG. 2 illustrates another exemplary system implementing a NSV2SV converter in accordance with the present invention.

FIG. 2 illustrates another exemplary system 200 implementing a non-scalable to scalable video (NSV2SV) converter. The system 200 includes the satellite 102 and the broadcasting station servers 104 communicating via the network 106.

The system 200 further includes end devices 202-1, 202-2, 202-3, and 202-4 (collectively, devices 202) communicating with the broadcasting station servers 104 via the network 106. The end devices 202 may be implemented as any of a variety of conventional computing devices, including, for example, a server, a desktop PC, a notebook or a portable computer, a workstation, a personal digital assistant (PDA), a mainframe computer, a mobile computing device, an Internet appliance, and so on.

In one implementation, the broadcasting station servers 104 can be configured to transmit video signals encoded in any of a variety of video coding standards such as H.264/AVC, H.263, MPEG-2, and so on. The transmitted video signal can be a non-scalable video signal subsuming a single layer bit stream of a certain input resolution. The non-scalable video signal can be transmitted from the satellite 102 either directly or via the broadcasting station servers 104 to the end devices 202.

In another implementation, the Broadcasting servers can be integrated with the NSV2SV converter directly. The broadcaster can then, convert a non-scalable video signal subsuming a single layer bit stream of a certain input resolution to a scalable video signal that subsumes a multi-layer bit stream having distinct resolution in each layer. The scalable video can be transmitted to the end devices, from the broadcasting stations either directly to or via the satellite, through the network devices consisting of an bit stream extractor which would transmit the video signal at the resolution for the end device.

In one implementation, each of the end devices 202 can be equipped with an extractor that receives information regarding the resolution supported by the respective end device. The extractor then extracts the layers corresponding to the supported resolution from the multi-layer bit stream. The extracted layers are then decoded and rendered at the respective end device.

Figure 3:
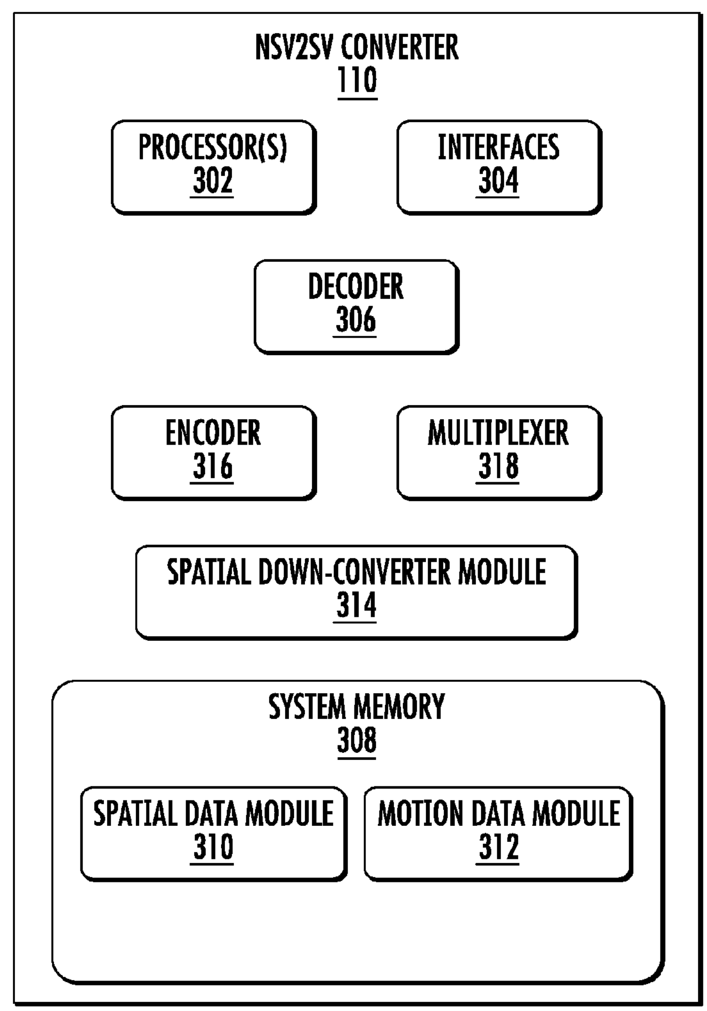
FIG. 3 illustrates an exemplary NSV2SV converter in accordance with the present invention.

FIG. 3 illustrates an exemplary NSV2SV converter 110. The NSV2SV converter 110 includes one or more processors 302, one or more interfaces 304, a decoder 306, a system memory 308 that includes a spatial data module 310 and a motion data module 312, a spatial down-converter module 314, an encoder 316 and a multiplexer 318. The processor(s) 302 may include, for example, microprocessors, microcomputers, microcontrollers, digital signal processors, central processing units, state machines, logic circuitries, and/or any devices that manipulate signals based on operational instructions. Among other capabilities, the processor(s) 302 are configured to fetch and execute computer-readable instructions stored in the memory 308.

The interface(s) 304 can include a variety of software interfaces, for example, application programming interface, hardware interfaces, for example cable connectors, or both. The interface(s) 304 facilitate receiving of the input non-scalable video signal and reliable transmission of the output scalable video signal A decoder 306 decodes a received input signal to produce a decoded signal. The received input signal can be a non-scalable video signal coded in any video coding standard, such as H.264/AVC, MPEG-2, and so on, that supports scalability. The decoded signal can be adapted in any intermediate format such as Common Intermediate Format (CIF), Quarter Common Intermediate Format (QCIF), and so on. The processors(s) 302 segment the decoded signal into spatial data and motion data, which are stored in the system memory 308.

The system memory 308 can include any computer-readable medium known in the art, including, for example, volatile memory (e.g., RAM) and/or non-volatile memory (e.g., flash, etc.). In one implementation, the system memory 308 includes a spatial data module 310 and a motion data module 312. The spatial data module 310 stores the decoded spatial data as pixel data information. The pixel data can be associated with attributes such as, for example, picture data, picture width, picture height, and so on, in a picture frame of the video sequence. The motion data module 312 stores the segmented motion data describing motion attributes, such as, for example, frame rate, picture type, end of stream flag, sequence frame number, motion vectors, Intra prediction mode, the location of different components in a picture frame such as pixels, blocks, macroblocks (MBs) and so on, and other related attributes such as MB modes, MB type, MB motion type, etc.

In operation, on receipt of a non-scalable input video signal, the decoder 306 decodes the input signal, which is then segmented into the spatial data and the motion data. The spatial data and the motion data are stored in the spatial data module 310 and the motion data module 312 respectively.

The spatial down-converter module 314 receives the spatial data from the spatial data module 310 and down-samples the spatial data for resizing the spatial data to conform to the different resolutions to be provided in the scalable output video signal. The down-sampling operation can be performed using a variety of techniques well known in the art. For example, the spatial data can be down-sampled by using various image compression filters such as polyphase filters, wavelet filters, and so on. The down-sampled spatial data and the segmented motion data are then fed to the encoder 316 for further processing.

The encoder 316 processes the decoded signal including the resized spatial data and the segmented motion data to produce a scalable video signal conforming to a video coding standard that is adaptable to the end devices 112, 202. Towards this end, the encoder 316 includes one or more encoding layers for encoding the previously decoded signal successively into multiple encoded signals such that each encoded signal corresponds to a distinct resolution.

The multiple encoded signals include an encoded base signal that includes the video signal in the basic or most coarse resolution form. The successive encoded signals include information for enhancing or fine tuning the coarse resolution progressively. Thus each encoded signal, when used in combination with encoded signals from previous encoding layers, provides a video signal of the corresponding distinct resolution.

The encoded signals from the multiple encoding layers of the encoder 316 are fed to the multiplexer 318. The multiplexer 318 multiplexes the encoded signals into a single encoded output video signal. The encoded output video signal exhibits spatial scalability due to the presence of multiple layers corresponding to distinct resolutions.

Figure 4:
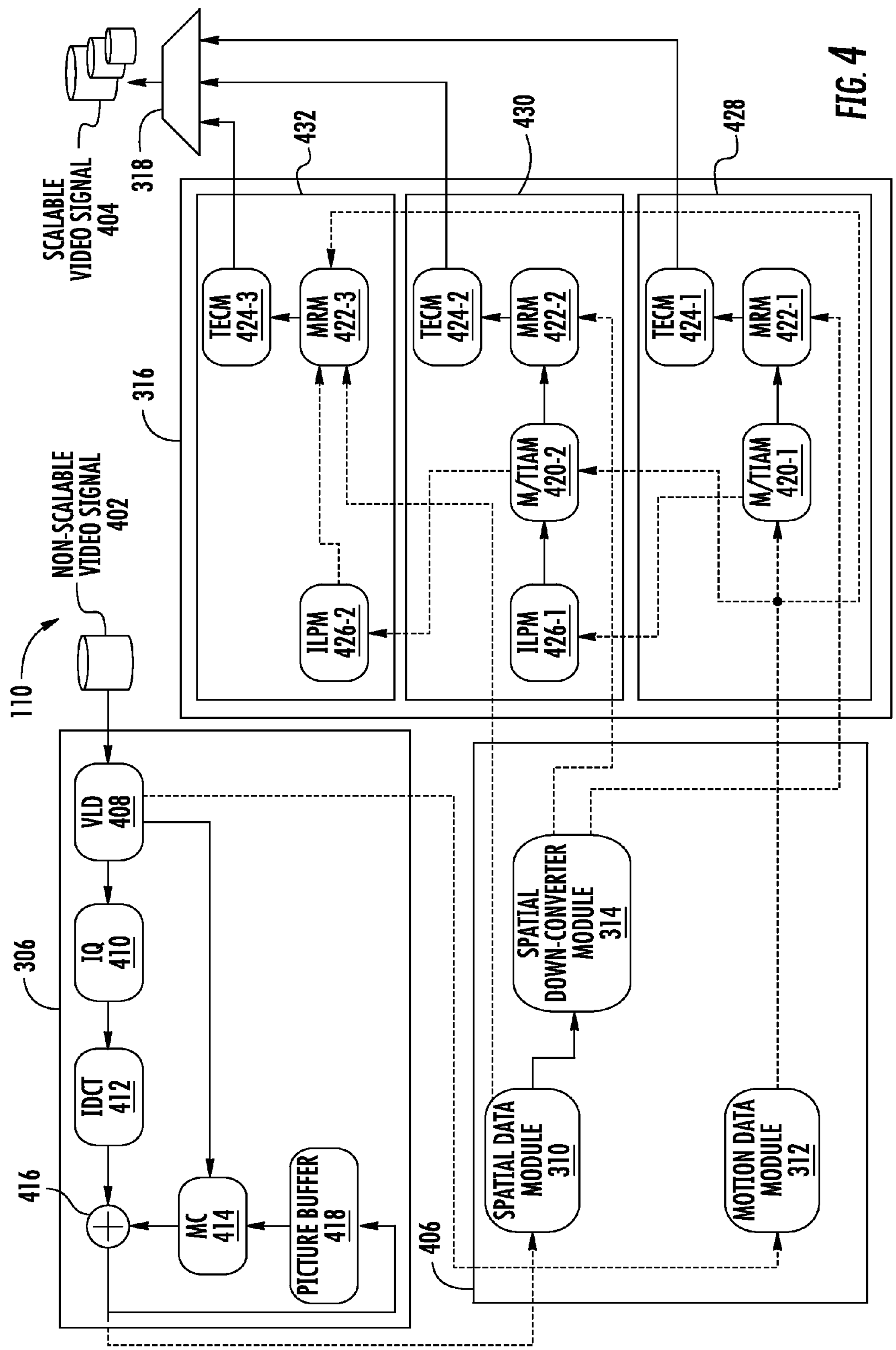
FIG. 4 illustrates an exemplary block diagram of a NSV2SV converter in accordance with the present invention.

FIG. 4 illustrates an exemplary block diagram of a NSV2SV converter 110. The order in which the blocks of the system are described is not intended to be construed as a limitation, and any number of the described system blocks can be combined in any order to implement the system, or an alternate system. Furthermore, the system can be implemented in any suitable hardware, software, firmware, or a combination thereof, without departing from the scope of the system.

The NSV2SV converter 110 is capable of converting a non-scalable input video signal 402, hereinafter referred to as input signal 402, to a scalable output video signal 404, hereinafter referred to as output signal 404. In an implementation, the input signal 402 can be coded in H.264/AVC standard. In such a case, the input signal 402 is a single layer bit stream of a certain input resolution. The input signal 402 can be transcoded into a scalable video coding (SVC) standard output signal 404 by the NSV2SV converter 110. In such a case, the output signal 404 subsumes a multi-layer bit stream corresponding to a distinct resolution in each layer and conforms to the SVC standard for video coding.

The scalable video coding (SVC) standard for video coding can be advantageously used for coding the output signal as it provides bit stream scalability for video signals. The SVC standard enables encoding of a high-quality input video signal into multiple sub-streams representing a lower spatial or temporal resolution or a lower quality video signal (each separately or in combination) as compared to the original bit stream. SVC also supports functionalities such as bit rate, format, and power adaptation. SVC further provides graceful degradation in lossy transmission environments as well as lossless rewriting of quality-scalable SVC bit streams to single-layer H.264/AVC bit streams. Additionally, SVC has achieved significant improvements in coding efficiency with an increased degree of supported scalability relative to the scalable profiles of prior video coding standards.

In one implementation, the NSV2SV converter 110 transforms the input signal 402 into the spatially scalable output signal 404 by converting the input signal 402 into the SVC standard format. For the above mentioned purpose, in an embodiment, the NSV2SV converter 110 includes the decoder 306, a segmentation section 406, the encoder 316 and the multiplexer 318.

In an implementation, the input signal 402 including a single layer bit stream, which is coded in, for example, H.264/AVC standard, is received by the decoder 306. At block 408, variable-length decoding (VLD) is performed on the received input signal 402 using techniques well known in the art. The variable-bit length decoding provides pixel and motion information based on the length of each Huffman code used to encode the input signal 402. The variable length decoded signal is then sent to block 410 for further processing for retrieval of spatial data and to the segmentation section 406 for storing and re-using motion data.

At block 410, the decoded signal is processed by application of inverse quantization (IQ) to determine the class and quantization number of the quantized discrete cosine transform (DCT) coefficient values included in the decoded signal. The magnitude of DOT coefficient values represent spatial frequencies corresponding to the average pixel brightness in the images of the input signal 402. The reciprocated quantized DCT coefficient values are then inversed at an inverse DCT (IDCT) block 412 to produce the Pixel values. The output of the MOT block 412 is capable of being used for reconstructing a video sequence from the DCT coefficients values.

Subsequently, the output of IDCT stage is added to the output of a motion compensation block 414 in an adder 416 to produce a decoded video sequence signal. Motion compensation is a technique of describing a picture in terms of transformation of a reference picture, located in a picture buffer 418, to the current picture. The output of the motion compensation block 414 provides differences between the reference picture and the current picture and is used for predicting picture frames for display. A variety of motion compensation techniques such as block motion compensation, overlapped motion compensation, variable block-size motion compensation, and so on can be employed to obtain the output and generate the decoded signal.

The decoded signal is then transmitted to the segmentation section 406. The segmentation section 406 includes a spatial data module 310, a motion data module 312, and a spatial down-converter module 314. In the segmentation section 406, the decoded signal is segmented to provide spatial data and motion data, which are stored in the spatial data module 310 and the motion data module 312 respectively. The spatial data module 310 stores the decoded spatial data as pixel data information. The pixel data can be associated with attributes such as, for example, picture data, picture width, picture height, and so on, in a picture frame of the video sequence. The motion data describes the location of different components such as pixels, blocks, macroblocks (MBs) and so on, of a picture frame and other related attributes such as MB modes, MB motion type and so on.

Subsequently, the spatial data is fed to the spatial down-converter module 314. The spatial down-converter module 314 down-samples the spatial data using various image compression filters such as polyphase filters, wavelet filters, and so on. Down-sampling of the spatial data reduces the data rate and/or the size of data. The reduction in size of spatial data is achieved based on the desired resolutions such as Common Intermediate Format (CIF) resolution, Quarter CIF (QCIF) resolution, and so on, in the scalable video output signal. The resized spatial data and the segmented motion data are then forwarded to the encoder 316.

The encoder 316 subsumes a multitude of encoding layers with each layer corresponding to a distinct resolution as explained earlier with reference to FIG. 3. The following description of the working of the encoder 316 has been provided with reference to 3 encoding layers. However, it will be understood that the encoder 316 can include any number of encoding layers and will work in a similar manner as that described herein.

In one implementation, when the encoder 316 includes three encoding layers, the encoder 316 includes two motion/texture info adaptation modules (M/TIAMs) 420-1 and 420-2, and three motion refinement modules (MRMs) 422-1, 422-2, and 422-3. The encoder 316 also includes three transform and entropy encoding modules (TECMs) 424-1, 424-2, and 424-3, and two inter-layer prediction modules (ILPMs) 426-1 and 426-2. These modules can be distributed over the three encoding layers, namely a base layer 428, an enhancement layer I 430, and an enhancement layer II 432.

In one embodiment, the base layer 428 includes the M/TIAM 420-1, the MRM 422-1, and the TECM 424-1. The enhancement layer I 430 includes M/TIAM 420-2, MRM 422-2, TECM 424-2, and ILPM 426-1. The enhancement layer II 432 includes MRM 422-3, TECM 424-3, and ILPM 426-2. The motion data and the down-sampled spatial data received from the segmentation section 406 are fed to all the layers of the encoder 316.

Base Layer

In an implementation, the base layer 428 receives the spatial data from the spatial down-converter module, which has been resized to the desired QCIF resolution, for example, 176×144 by the spatial down-converter module 314. The base layer also receives the segmented motion data for calculating motion information at the M/TIAM 420-1. The motion data, which includes original motion information from the H.264/AVC coded input video signal, is adapted so as to produce a resultant QCIF output. The M/TIAM 420-1 calculates the motion information by reusing the original motion information subsumed in the original H.264/AVC coded video signal. As the original motion information is re-used and adapted to generate the motion information, the computational complexity involved is reduced by a large extent as compared to generating the motion information from a completely decoded signal. The calculated and adapted motion information is then used for motion estimation.

The technique of motion estimation helps in finding the best match between the pixels in a current video frame, hereinafter referred to as current frame, and the pixels in a reference video frame, hereinafter referred to as reference frame. The current frame corresponds to the complete picture that is in the process of construction, for a video sequence. The reference frame corresponds to an already constructed complete picture in a video sequence used to describe the current frame.

In the technique of motion estimation, a search area within the reference frame is traversed to find a best match for the component in the current frame. For this, the size of search area and the evaluation metrics used for determining the best match are the most crucial factors. The size of the search area corresponds to the applied computational load and the evaluation metrics corresponds to the degree of coding efficiency. Different types of motion estimation techniques such as block matching, pixel recursive technique, and so on are used. The motion estimation techniques use a variety of evaluation metrics such as Sum of Absolute Differences (SAD), Mean Absolute Differences (MAD), Mean Square Error (MSE), etc.

In an implementation, a search is performed for a macroblock in the reference frame corresponding to a macroblock in the current frame. The best match is found by comparing the macroblock in the current frame with the macroblocks in the search area in the reference frame. In one implementation, the macroblocks are compared by using difference in the corresponding pixel values. This provides difference values called as SAD values. The minimum of the SAD values corresponds to the closest linked pixel value in the reference frame for the current frame. In other words, a variation in the SAD value can be referred to as the cost associated with the MB. The MB in the reference frame having the minimum cost corresponds to the best match or the best MB available for coding the MB in the current frame. After finding the best match, the difference values between the corresponding pixels are coded together with the difference between the corresponding pixel locations. The location of a pixel can be defined by a motion vector.

For the purpose of understanding, consider a block made up of 8×8 pixels. Four blocks can be combined together to form a single macroblock of 16×16 pixels i.e.

$$\text{One Macroblock=Four Blocks} \quad (1)$$

$$16\times16 \text{ pixels}=4\times(8\times8) \text{ pixels} \quad (2)$$

In an implementation, for producing the QCIF output, macroblock (MB) modes and motion vectors (MVs) are the prime attributes that need to be calculated. An MB mode refers to the degree of partition in the MB. For example, inter-mode 1 refers to a MB having one partition of 16×16 pixels, inter-mode 2 refers to a MB having two partitions of 16×8 pixels, inter-mode 3 refers to a MB having two partitions of 8×16 pixels, and so on. Also, the macroblock can be coded using an inter mode or an intra mode. The motion vector refers to a two-dimension vector used for inter prediction that provides an offset from the coordinates in the current frame to the coordinates in a reference frame.

Conversion of Input Motion Data to 4QCIF

The MB modes and the MVs from the motion data module 312 together constitute the input motion data (D1), which is adapted to four times the intended QCIF resolution (4QCIF). The QCIF resolution corresponds to a resolution of 176×144. This is performed so that, in the next step, a direct mapping can take place for the intended QCIF resolution. This can be understood by referring to aforesaid equations (1) and (2) and to equations discussed below:

$$16\times16 \text{ pixels to be reduced to } 8\times8 \text{ pixels} \quad (3)$$

$$\text{Therefore, } 4\times(16\times16) \text{ pixels to be reduced to } 4.\ (8\times8) \text{ pixels} \quad (4)$$

$$\text{Or, 4 Macroblocks to be reduced to 1 Macroblock} \quad (5)$$

The above equations show that the width and height ratio is exactly two between 4QCIF and QCIF. Also, since while mapping from D1 to 4QCIF the width and height ratios may not be exactly two, the principle of dominant MB mode can be used to map the MBs from D1 to 4QCIF. Further, based on the MB modes of the candidate MBs in D1, a single MB mode is calculated for the corresponding MB in 4QCIF. The candidate MBs are those MBs, which qualify for being mapped based on the width and height ratios, and overlap area.

The MB mode can be calculated by using either forward prediction method or intra prediction method known in the art. Further, if any of the candidate MB mode in D1 is intra mode, then the resultant MB mode in 4QCIF is calculated as intra mode, irrespective of the dominant MB mode. Further, based on the MVs of all the candidate MBs in D1, the single MV for 4QCIF can be derived using a variety of techniques already known in the art. In one implementation, a single MV for 4QCIF can be computed by calculating the median of the candidate MVs in D1.

Conversion of 4QCIF to QCIF

The MB modes and MVs from 4QCIF are mapped to the intended QCIF resolution, based on the principle of dominant mode. Depending upon the MB modes of a set of four candidate MBs in the 4QCIF resolution, a single MB mode is derived for the resultant QCIF MB. If any of the candidate MB modes is intra mode then the resultant MB is also coded using the intra mode, irrespective of the dominant MB mode among the four candidate MBs. Also, each MB in 4QCIF is checked by the encoder 316 for if it can be skipped. The MB can be skipped if the corresponding MV is zero or very close to zero. This situation can arise when the closet matching region is at the same or almost at the same location in the reference frame and the energy of a residual MB is low. The residual MB is formed by subtracting the reference MB (without motion compensation) from the current MB. The energy of the residual MB is approximated by SAD values. Therefore, if the cost of coding the MB as skip is lesser than that decided by the M/TIAM 420-1, then skip mode can be followed. This corresponds to the act of dealing away from the task of coding a current macroblock, thus reducing the computational load.

Subsequently, in an implementation, all MBs in the QCIF resolution are set in 8×8 coding mode by using forward prediction method. The 8×8 coding mode corresponds to four 8×8 block partitions for each MB. However, if the MBs in the QCIF resolution are intra coded, then the QCIF MBs are not set in 8×8 coding mode. An MV of each 8×8 block of each MB in the QCIF resolution is set equal to an MV of the corresponding MB in the 4QCIF resolution by scaling it accordingly. The calculated motion information including MBs and MVs for the intended QCIF resolution and other related information thereto, is then sent to MRM 422-1 for further refinement of the QCIF resolution.

The MRM 422-1 receives the motion information from the M/TIAM 420-1 and the resized spatial data from the spatial down-converter module 314. In the MRM 422-1, all the calculated MVs of the intended QCIF resolution from M/TIAM 420-1 undergo a refinement process based on the received resized spatial data. For the purpose, slight approximations are further added to the motion information, such as the calculated MVs, for finding the best possible mode for the MB located in the current frame. This is performed so that the MB located in the current frame is closest to the mode of the MB located in the reference frame. The approximations are found out by using various techniques already known in the art. The process of refinement is carried out at the most granular level corresponding to the refinement of motion information at quarter of a pixel (QPel) level. The refined motion data and spatial data (RMS) are then forwarded to TECM 424-1.

In TECM 424-1, in an implementation, RMS subsumed in each block of the QCIF macroblock, which forms the QCIF resolution, is transformed into low frequency DCT coefficient values using a variety of transformation techniques already known in the art. RMS is then entropy coded using a number of entropy coding techniques such as context-based adaptive variable-length coding (CAVLC), context-based adaptive binary arithmetic coding (CABAC), and so on. Therefore, a desired encoded QCIF resolution output is received as the output of TEC 424-1, which is sent to a multiplexer 318.

Enhancement Layer

For obtaining an output of another resolution, for example, CIF resolution, as part of the final scalable video signal, the enhancement layer I 430 is used. In an implementation, the spatial data can be resited to the desired CIF resolution, i.e., 352×288 by the spatial down-converter module 314 before feeding it to the enhancement layer I 430. On the other hand, the motion information from the decoded signal, which includes the original motion information subsumed in the H.264/AVC coded input video signal, is adapted so as to produce a resultant CIF output. Correspondingly, the motion information for the resultant CIF output is calculated by reusing the original motion information subsumed in the original H.264/AVC coded video signal. The calculation of motion information is performed for motion estimation as described below.

The enhancement layer 1438 includes ILPM 426-1, M/TIAM 420-2, MRM 422-2, and TECM 424-2. The ILPM 426-1 provides an exploitation of the statistical dependencies between different layers for improving the coding efficiency of the enhancement layer. The improvement in coding efficiency can be referred to in terms of a reduction in bit rate. The ILPM 426-1 uses various inter-layer prediction methods employing the reconstructed samples of QCIF MB from the base layer 428 to produce an inter-layer prediction signal. The inter-layer prediction signal can be formed by using different methods, such as motion compensated prediction inside the enhancement layer, by up-sampling the reconstructed base layer signal, and so on. These methods are dependent on various parameters, for example, prediction of MB modes and associated motion vectors. Correspondingly, the encoder 316 checks for each MB at D1 resolution for it can be inter-layer predicted from the base layer 428. Therefore, the encoder 316 checks for intra, motion and residual inter-layer predictions while coding each MB.

The inter-layer prediction signal from the ILPM 426-1 and the D1 stored in the motion data module are fed to the M/TIAM 420-2 for performing the process of motion estimation. In the M/TIAM 420-2, the received D1 is adapted to have the output of the desired resolution. In one implementation, the received D1 is adapted to the resultant CIF output.

For producing the CIF output, the MB modes and the MVs are the prime attributes to be calculated. The MB modes refer to the degree of partition in the macroblocks. For example, mode 1 refers to an MB having one partition of 16×16 pixels, mode 2 refers to an MB having two partitions of 16×8 pixels, mode 3 refers to an MB having two partitions of 8×16 pixels, and so on. Also, the macroblock can be coded using inter mode or intra mode.

As part of the calculation, MB modes and MVs from D1 are adapted to the CIF output by using the principle of dominant mode. Since the overlap area may not be an integral multiple of the number of MBs, the candidate MBs from D1 are selected based on width and height ratios and overlap area. Further, based on the MB modes of the candidate MBs in D1, a single MB mode is calculated for a corresponding MB in CIF. The candidate MBs are those MBs that qualify for being mapped based on width and height ratios and the overlap area. A single MB mode can be calculated either by forward prediction or intra prediction. However, if any of the candidate MB modes is intra mode, then the resultant single MB mode is calculated as intra mode, irrespective of the dominant MB mode.

Also, each MB is checked by the encoder 316 if it can be skipped. The MB can be skipped if the corresponding MV is zero or very close to zero. This situation can arise when the closet matching region is at the same or almost at the same position in the reference frame and the energy of a residual MB is low. The residual MB is formed by subtracting the reference MB (without motion compensation) from the current MB. The energy of the residual MB is approximated by SAD values. Therefore, if the cost of coding the MB as skip is lesser than that decided by the M/TIAM 420-2, then skip mode can be followed. This corresponds to the act of dealing away from the task of coding the current macroblock, and thus reducing computational load.

The MB mode corresponds to the degree of partitioning appearing in a macroblock, such as partitions of 16×16 or 16×8 or 8×16 or 8×8. The MB mode for the CIF MB is decided using the principle of dominant MB mode partition. Depending upon the dominant partition mode among the candidate MBs of D1, the final CIF MB mode partition is decided. Further, an MV for the MB in the image of CIF resolution is decided based on MB mode partition and candidate MVs in D1 image. The candidate MVs are MVs corresponding to the candidate MBs. It is to be noted that four MBs of D1 are combined to form one MB of CIF image.

When the CIF MB mode is calculated as 16×16, the final MV of the CIF MB is calculated as the median of candidates in a set of four candidate MVs in D1. Further, if any of the candidate MB in D1 is not 16×16, the MV of the top left sub-partition is considered to be the MV of the complete MB.

When the CIF MB mode is calculated as 16×8, the MV for the top 16×8 partition is calculated as the median of the MVs of top two 16×16 MBs in D1, while the MV of the bottom 16×8 partition is the median of the MVs of bottom two 16×16 MBs in D1. Further, if any of the candidate MBs in D1 is not 16×16, the MV of top left sub-partition is considered to be the MV of the complete MB.

When the CIF MB mode is calculated as 8×16, the final MV of the left 8×16 partition is calculated as the median of left two 16×16 MBs in D1, and the MV of the right 8×16 partition is the median of the right two 16×16 MBs in D1. Further, if any of the candidate MBs in D1 is not 16×16, the MV of the top left-partition is considered to be the MV of the complete MB.

When the CIF MB mode is calculated as 8×8, the MV for each 8×8 MB partition at CIF resolution is equaled to MV of the corresponding 16×16 MB in D1. The calculated motion information including MBs and MVs for the CIF resolution and other related information thereto, are then sent to MRM 422-2 for further refinement of the CIF resolution.

MRM 422-2 receives the motion information from the M/TIAM 420-2 and the resized spatial data from the spatial down-converter module 314. In the MRM 422-2, the calculated MVs of the CIF resolution from M/TIAM 420-2 undergo a refinement process based on the received resized spatial data. For the purpose, slight approximations are further added to the motion information, including the calculated MVs, for finding the best possible mode for the MB located in the current frame. This is performed so that MB located in the current picture is closest to the mode of the MB located in the reference frame. The approximations are found out by using various techniques already known in the art. The process of refinement is carried out at the most granular level corresponding to the refinement of motion information at quarter of a pixel (QPel) level. The refined motion data and spatial data (RMS) are then forwarded to TECM 426-2.

In TECM 426-2, in an implementation, RMS subsumed in each block of the constructed macroblock, which forms the CIF resolution, is transformed into low frequency DOT coefficient values using a variety of transformation techniques already known in the art. The refined motion data and spatial data are then entropy coded using a number of entropy coding techniques such as context-based adaptive variable-length coding (OAVLC), context-based adaptive binary arithmetic coding (CABAL), and so on. Therefore, a desired encoded CIF resolution output is received as the output of TECM 426-2 that is sent to the multiplexer 318.

Enhancement Layer II

For obtaining an output that is having inherently the same resolution as that of the original input signal, which forms a part of the final scalable video signal, the enhancement layer II 432 is used. The spatial and motion information included in the original H.264/AVC coded video signal is directly reused, thereby removing the requirement of M/TIAM. The input spatial data from the spatial data module 314 is fed directly to the enhancement layer II 432 of the encoder 316 without resiting. In an encoder with more than 3 layers, the top-most enhancement layer will be configured in a manner similar to that of enhancement layer II 432, while the intermediate enhancement layers will be configured in a manner similar to that of enhancement layer I 430.

The enhancement layer II 432 includes ILPM 426-2, MRM 422-3, an TECM 424-3. The ILPM 426-2 provides an exploitation of the statistical dependencies between different layers for improving the coding efficiency of the enhancement layer. The improvement in coding efficiency can refer to a reduction in bit rate. The ILPM 426-2 uses various inter-layer prediction methods employing the reconstructed samples from enhancement layer I 430 to produce an inter-layer prediction signal. The inter-layer prediction signal can be formed by using different methods such as motion compensated prediction inside the enhancement layer, by up-sampling the reconstructed enhancement layer I 430 signal, and so on. These methods are dependent on various parameters, for example, prediction of MB modes and associated motion vectors. Correspondingly, the encoder 316 checks for each MB at CIF resolution for it can be inter-layer predicted from the enhancement layer I 430. Therefore, the encoder checks for intra, motion, and residual inter-layer predictions while coding each MB. The inter-layer prediction signal from the ILPM 426-2 and the original spatial information stored in the spatial data module 314 are fed directly to the MRM 422-3.

The MB information, such as MB mode, MB partition, and MVs, included in the motion information are directly replicated as the input signal. Also, each MB is checked by the encoder 316 if it can be skipped. The MB can be skipped if the corresponding MV is zero or very close to zero. This situation can arise when the closet matching region is at the same or almost at the same position in the reference frame and the energy of a residual MB is low. The energy of the residual MB formed by subtracting the reference MB (without motion compensation) from the current MB is approximated by SAD values. Therefore, if the cost of coding the MB as skip is less, then skip mode can be followed. This corresponds to the act of dealing away from the task of coding the current macroblock and reduces the computational load.

In MRM 422-3, only MVs are refined based on the received spatial data. For the purpose, slight approximations are further added to the motion information, which includes the calculated MVs, for finding the best possible mode for the MB located in the current frame. This is performed so that an MB located in the current frame is closest to the mode of the MB located in the reference frame. The approximations are found out by using various techniques already known in the art. The process of refinement is carried out at the most granular level corresponding to the refinement of motion information at quarter of a pixel (QPel) level. The refined motion data and spatial data (RMS) are then forwarded to TECM 424-3.

In TECM 424-3, in an implementation, RMS subsumed in each block of the constructed macroblock, which is of the resolution equivalent to the original resolution, is transformed into low frequency DOT coefficient values using a variety of transformation techniques already known in the art. RMS is then entropy coded using a number of entropy coding techniques such as context-based adaptive variable-length coding (CAVLC), context-based adaptive binary arithmetic coding (CABAC), and so on. Therefore, the output of resolution equivalent to the original resolution is received as the output of TECM 424-3, which is then sent to the multiplexer 318.

In the multiplexer 318, the SVC outputs of distinct resolutions from each layer, namely base layer 428, enhancement layer I 430, and enhancement layer II 432 are multiplexed. The multiplexing of SVC outputs from different layers refers to the act of combing the received multiple SVC outputs into a single signal. This single signal is the scalable output video signal 404 having multiple signals of different resolutions. Also, the multiplexer 318 can be of different configurations depending upon the number of signals to be multiplexed.

Figure 5A:
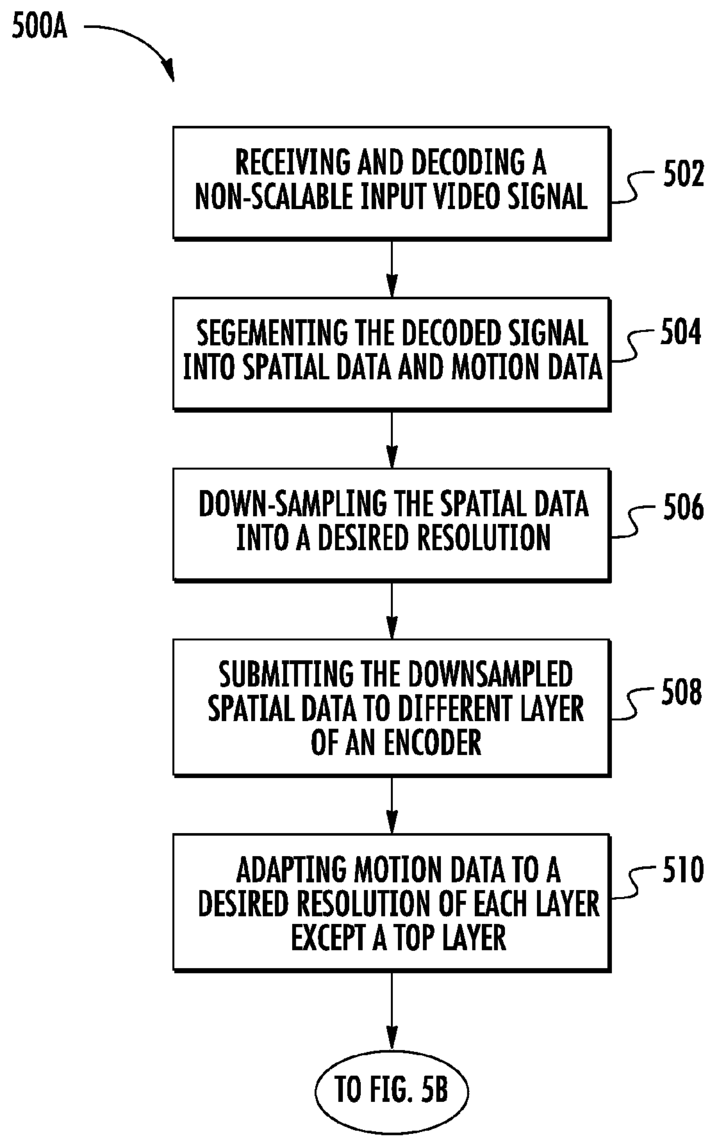
FIGS. 5*a* and 5*b* illustrate an exemplary method for implementing a NSV2SV converter in accordance with the present invention.
Figure 5B:
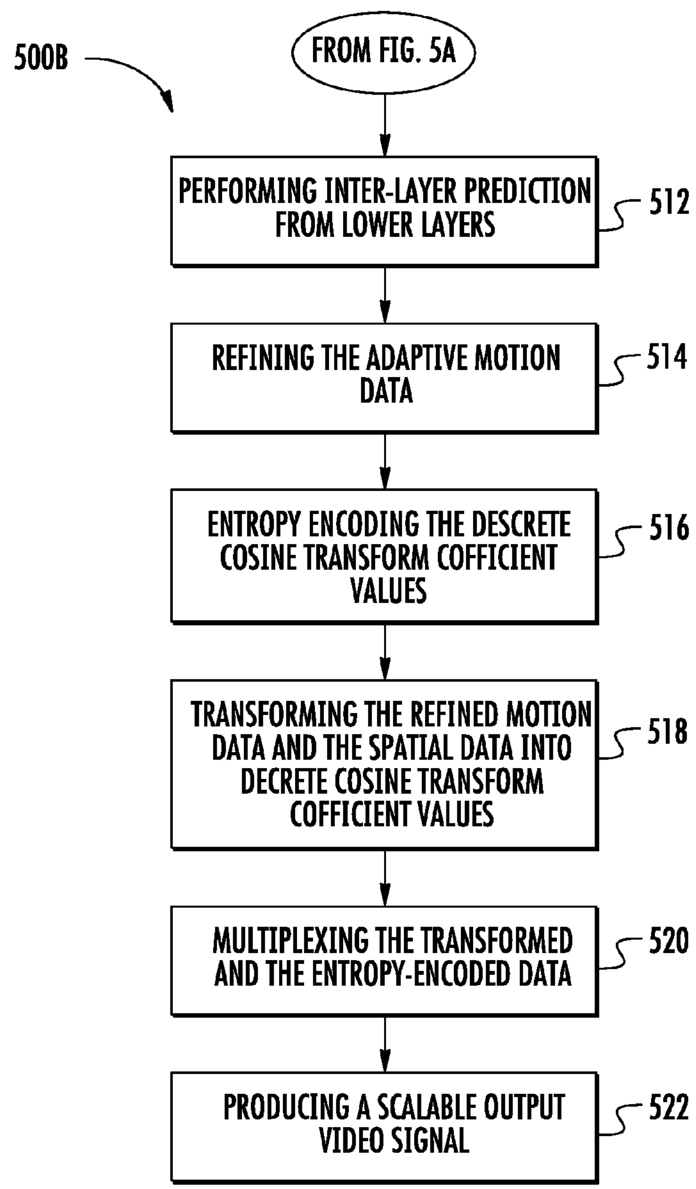

FIG. 5 illustrates an exemplary method 500 for implementing a NSV2SV converter 110. These exemplary methods may be described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium and can be loaded or embedded in an appropriate device for execution.

The order in which the method is described is not intended to be construed as a limitation, and any number of the described method blocks can be combined in any order to implement the method, or an alternate method. Additionally, individual blocks may be deleted from the method without departing from the spirit and scope of the subject matter described herein. Furthermore, the method can be implemented in any suitable hardware, software, firmware, or combination thereof.

At block 502, an input signal is received and decoded. In one implementation, the input signal can be a non-scalable video signal 402 subsuming a single layer bit stream of a certain resolution. For example, the non-scalable video signal 402 can be a video signal coded in any video coding standard such as H.264/AVC, MPEG-2, and so on that supports scalability. The non-scalable video signal 402 is received by the NS2SV converter 110 from the broadcasting station servers 104 via the network 106. The received video signal is then decoded by the decoder 306.

In one implementation, the decoder 306 converts the received video signal into a signal that can be adapted in any intermediate format such as Common Intermediate Format (CIF), Quarter Common Intermediate Format (QCIF), and so on. The received video signal undergoes variable-length decoding (VLD) 408 using techniques known in the art. The decoded signal is subjected to inverse quantization 410 determining the class and quantization number of the quantized discrete cosine transform (DOT) coefficient values included in the decoded signal.

Further, the quantized DOT coefficient values are reciprocated at the inverse DCT (IDCT) 412 to produce the IDCT coefficient values. The output of the IDCT is added with output of the motion compensation stage 414 to produce a smooth video sequence. The motion compensation can be performed by a variety of techniques such as block motion compensation, overlapped motion compensation, variable block-size motion compensation and so on.

At block 504, a decoded signal is subjected to the segmentation section 406. In one implementation, the processors 302 segment the decoded signal using segmentation techniques well known in the art. The decoded signal is segmented into the spatial data, which is stored in spatial data module 310 and the motion data, which is stored in motion data module 312. The spatial data module 310 and the motion data module 312 can be stored in the system memory 308. The spatial data module 310 stores the decoded spatial data as pixel data information. The pixel data can be associated with attributes such as, for example, picture data, picture width, picture height, and so on, in a picture frame of the video sequence. The motion data describes the location of different components in a picture frame such as pixels, blocks, macroblocks (MBs) and so on, and other related attributes such as MB modes, MB motion type and so on.

At block 506, spatial data is sampled to a desired resolution. In one implementation, the spatial data is down sampled by a spatial down-converter module 310 to adjust the corresponding data size. The down sampling of the spatial data enables resizing of the spatial data to conform to the desired resolution depending upon the targeted end devices 112. The down sampling of the spatial data reduces the data rate or the size of the data. The reduction in size of the spatial data is achieved based on the desired resolution such as Common Intermediate Format (CIF) resolution, Quarter CIF (QCIF) resolution, and so on. The down-sampling operation can be performed using a variety of techniques well known in the art. For example, the spatial data can be sampled by using various image compression filters such as polyphase filters, wavelet filters, and so on.

At block 508, the sampled spatial data and original motion data is submitted to an encoder, such as the encoder 316. In one implementation, the down-sampled spatial data and the original motion data is submitted to different layers of the encoder 316. The original motion data is obtained from the VLD 408 and fed to the encoder 316. The encoder 316 includes a multitude of layers each having a distinct resolution. In one implementation, the encoder can include a base layer 428, an enhancement layer I 430, an enhancement layer II 432. For example, the base layer 428 has 640×480 resolutions, whereas the enhancement layer I 430 has 1280>720 resolutions, and so on. The base layer 428 includes M/TIAM 420-1, MRM 422-1 and TECM 424-1, the enhancement layer 1428 includes M/TIAM 420-2, MRM 422-2, TECM 424-2 and ILPM 426-1, and the enhancement layer II 432 includes MRM 422-3, TECM 424-3 and ILPM 428-2.

At block 510, motion data is adapted to a desired resolution. In one implementation, the motion data received from the segmentation section 406 is adapted to the desired resolution of each layer, except the top-most enhancement layer. The motion data is fed into the Motion/Texture Info Adaptation Module (M/TIAM) 420 of each layer for calculating the motion information such as motion vector (MV) for the resultant decoded signal. The motion information calculated in the previous layer can be used by the next layer. For example, the motion information calculated by the M/TIAM 420-1 of the base layer 428 can be used by the ILPM 426-1 of the enhancement layer I 430. Further, the motion information calculated by the M/TIAM 420-2 of the enhancement layer I 430 can be used by the ILPM 426-2 of the enhancement layer II 432, and so on. However, the M/TIAM 420 is not present for the top-most enhancement layer since the information from the input is being directly reused. The top-most enhancement layer is adapted at the same resolution of the input signal.

At block 512, the encoder performs Inter-Layer Prediction for the current layer from the layer of lower resolution to provide further compression. At block 514, the adapted motion data are refined based on the down sampled spatial data. In one implementation, the calculated motion information from the M/TIAM 420 undergoes a refinement process at the Motion Refinement Module (MRM) 422 based on the down sampled spatial data to improve the quality of the resulting motion information. The MRM 422 performs slight approximations on the calculated motion information including the calculated MVs in all the layers for finding the best possible mode for the MB located in the current picture frame. The approximations can be performed by using various techniques already known in the art.

At block 516, the refined motion data and spatial data are transformed into discrete cosine transform (DCT) coefficient values. In one implementation, the refined motion information and the spatial data undergo transformation, for example, discrete cosine transformation. The transformation results in discrete cosine transform (DCT) coefficient values of the refined motion data and spatial data.

At block 518, the DOT coefficient values are entropy-encoded. In one implementation, in each layer, the DOT coefficient values obtained in the block 514 are compressed using compression techniques known in the art. In one implementation, an entropy-encoding technique is applied on the DCT coefficient values and an encoded video signal is obtained.

At block 520, the transformed and entropy-encoded data is multiplexed. In one implementation, the transformed and encoded data obtained in each layer are provided as input to the multiplexer 318. The multiplexer 318 combines the transformed and encoded data from each layer into a single data corresponding to a single video signal.

At block 522, a scalable output video signal is produced. In one implementation, the output of the multiplexer 318 can be a single video signal that exhibits a scalable video signal 404. The scalable video signal 404 can be a multi-layer bit stream subsuming a distinct resolution in each layer. The scalable video signal 404 is encoded in the SVC standard.

Although embodiments for a NSV2SV converter have been described in language specific to structural features and/or methods, it is to be understood that the appended claims are not necessarily limited to the specific features or methods described. Rather, the specific features and methods are disclosed as exemplary implementations for the programmable compensation network.

That which is claimed:

1. A system comprising:

an intermediate device;

a communications network;

a broadcasting system configured to transmit a non-scalable input video signal to said intermediate device via said communications network;

said intermediate device comprising a converter configured to convert the non-scalable input video signal into a scalable output video signal having a multi-layer bit stream, each layer corresponding to a different resolution, said converter being configured to reuse motion information from the non-scalable input video signal to generate the scalable output video signal; and a receiving device configured to receive the scalable output video signal from said intermediate device and use layers from the multi-layer bit stream corresponding to a supported resolution.

2. The system as claimed in claim 1, wherein said broadcasting system comprises one of a satellite, and a satellite along with a plurality of broadcasting station servers cooperating therewith.

3. The system as claimed in claim 1, wherein the receiving device comprises one of a mobile communication device, a telecommunication device, and a computing device.

4. The system as claimed in claim 1, wherein at least one of said receiving device and said intermediate device comprises an extractor configured to extract layers from the multi-layer bit stream corresponding to the resolution supported by the receiving device.

5. A system comprising:

a broadcasting system for transmitting a non-scalable input video signal;

said broadcasting system comprising a converter configured to convert a non-scalable input video signal into a scalable output video signal having a multi-layer bit stream, each layer corresponding to a different resolution, said converter being configured to reuse motion information from the non-scalable input video signal;

a communications network; and a receiving device configured to receive the scalable output video signal from said converter via said communications network, said receiving device being configured to render layers from the multi-layer bit stream corresponding to a resolution supported thereby.

6. The system as claimed in claim 5, wherein said receiving device comprises an extractor configured to extract layers from the multi-layer bit stream.

7. The system as claimed in claim 5, wherein said receiving device is one of a mobile communication device, a telecommunication device, and a computing device.

8. A device for converting a non-scalable input video signal transmitted via a communications network from a broadcasting system to a scalable output video signal for a downstream receiving device, the device comprising:

a decoder configured to receive, via said communications network, and decode the non-scalable input video signal to produce a decoded signal; and an encoder configured to reuse spatial data and motion data in the decoded signal to generate a plurality of encoded signals for the downstream receiving device, the encoder being configured to multiplex the plurality of encoded signals to generate the scalable output video signal.

9. The device as claimed in claim 8, wherein the non-scalable input video signal comprises a single layer bit stream.

10. The device as claimed in claim 8, wherein the non-scalable input video signal comprises a non-scalable input video signal coded as per H.264/AVC standard.

11. The device as claimed in claim 8, wherein the scalable output video signal comprises a scalable output video signal coded as per Scalable Video Coding (SVC) standard.

12. The device as claimed in claim 8 further comprising a motion data module configured to store the motion data.

13. The device as claimed in claim 8 further comprising a spatial data module configured to store the spatial data.

14. The device as claimed in claim 8 further comprising a spatial down-converter module configured to down-sample the spatial data.

15. The device as claimed in claim 8, wherein said encoder comprises a plurality of encoding layers each corresponding to a different resolution.

16. The device as claimed in claim 15, wherein the encoding layers comprise at least one of an adaptation module, an inter-layer prediction module, a motion refinement module, and a transform and entropy encoding module.

17. The device as claimed in claim 16, wherein the adaptation module is configured to adapt the motion data to conform to the different resolution of the corresponding layer; wherein said motion refinement module being configured to refine at least one of the motion data, the adapted motion data, and the spatial data to generate refined motion and spatial data; wherein said inter-layer prediction module being configured to predict motion information based on the adapted motion data of a previous encoding layer; and wherein said transform and entropy encoding module being configured to transform and entropy encode the refined motion and spatial data to produce an encoded signal.

18. A method for converting a non-scalable input video signal to a scalable output video signal, the method comprising:

receiving the non-scalable input video signal from a broadcasting system via a communications network;

decoding the non-scalable input video signal to produce a decoded signal using a decoder;

generating a plurality of encoded signals by reusing motion information included in the decoded signal, the plurality of encoded signals corresponding to different resolutions using an encoder; and multiplexing, also using the encoder, the plurality of encoded signals to generate the scalable output video signal for a downstream receiving device.

19. The method as claimed in claim 18, wherein the non-scalable input video signal comprises a single layer bit stream.

20. The method as claimed in claim 18, wherein the non-scalable input video signal comprises a non-scalable input video signal coded as per H.264/AVC standard.

21. The method as claimed in claim 18, wherein the scalable output video signal comprises a scalable output video signal coded as per Scalable Video Coding (SVC) standard.

22. The method as claimed in claim 18, wherein generating the plurality of encoded signals comprises:

segmenting the decoded signal by extracting spatial data and motion data for reuse;

down-sampling the extracted spatial data to multiple resolutions; and transmitting the down-sampled spatial data to multiple encoding layers, each encoding layer corresponding to a resolution from the multiple resolutions of the down-sampled spatial data.

23. The method as claimed in claim 22 further comprising, at each encoding layer:

adapting the motion data to the corresponding resolution;

refining the adapted motion data and the down-sampled spatial data to produce refined motion and spatial data; and transforming and encoding the refined motion and spatial data to produce an encoded signal.

24. A non-transitory computer-readable medium comprising computer executable instructions for converting a non-scalable input video signal to a scalable output video signal, the computer-readable medium comprising instructions for:

receiving the non-scalable input video signal from a broadcasting system via a communications network;

decoding the non-scalable input video signal to produce a decoded signal;

generating a plurality of encoded signals by reusing motion information included in the decoded signal, the plurality of encoded signals corresponding to different resolutions; and multiplexing the plurality of encoded signals to generate the scalable output video signal for a downstream receiving device.

25. The non-transitory computer-readable medium as claimed in claim 24, wherein generating the plurality of encoded signals comprises:

segmenting the decoded signal by extracting spatial data and motion data for reuse;

down-sampling the extracted spatial data to multiple resolutions; and transmitting the down-sampled spatial data to multiple encoding layers, each encoding layer corresponding to a resolution from the multiple resolutions of the down-sampled spatial data.

26. The non-transitory computer-readable medium as claimed in claim 25, further comprising instructions for, at each encoding layer:

adapting the motion data to the corresponding resolution; and refining the adapted motion data and the down-sampled spatial data to produce refined motion and spatial data; and transforming and encoding the refined motion and spatial data to produce an encoded signal.

* * * * *